US010661669B1

(12) United States Patent
Torok et al.

(10) Patent No.: US 10,661,669 B1
(45) Date of Patent: May 26, 2020

(54) CHARGING STATION WITH PASSIVE ALIGNMENT MECHANISM

(71) Applicant: Apple Inc., Cupertino, CA (US)

(72) Inventors: Matthew M. Torok, Los Altos, CA (US); Foster D. Collins, Salt Lake City, UT (US); William M. Price, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 16/106,048

(22) Filed: Aug. 21, 2018

Related U.S. Application Data

(60) Provisional application No. 62/555,132, filed on Sep. 7, 2017.

(51) Int. Cl.
*B60L 53/14* (2019.01)
*B60L 53/30* (2019.01)

(52) U.S. Cl.
CPC ............... *B60L 53/14* (2019.02); *B60L 53/30* (2019.02); *B60L 2230/12* (2013.01); *B60Y 2200/91* (2013.01); *B60Y 2300/91* (2013.01)

(58) Field of Classification Search
CPC ...................................................... B60L 53/14
USPC ........................................................ 320/109
See application file for complete search history.

(56) References Cited

U.S. PATENT DOCUMENTS

| | | |
|---|---|---|
| 3,117,800 A | 1/1964 | Magnuson |
| 5,252,078 A | 10/1993 | Langenbahn |
| 5,343,295 A | 8/1994 | Lara et al. |
| 5,441,298 A | 8/1995 | Miller et al. |
| 5,461,298 A | 10/1995 | Lara et al. |
| 5,850,135 A | 12/1998 | Kuki et al. |
| 6,082,715 A | 7/2000 | Vandermolen |
| 6,157,162 A * | 12/2000 | Hayashi ............... H02J 7/0027 320/104 |
| 6,382,370 B1 | 5/2002 | Girvin |
| 6,634,445 B2 | 10/2003 | Dix et al. |
| 8,022,667 B2 * | 9/2011 | Anderson ............ H01M 10/44 320/109 |
| 9,056,555 B1 | 6/2015 | Zhou |
| 9,227,520 B2 * | 1/2016 | Kimura ............... B60L 11/1818 |
| 2005/0189729 A1 | 9/2005 | Dorr |
| 2010/0201309 A1* | 8/2010 | Meek ...................... B60L 53/34 320/108 |
| 2011/0066515 A1 | 3/2011 | Horvath et al. |

(Continued)

FOREIGN PATENT DOCUMENTS

| | | |
|---|---|---|
| DE | 102012003303 B4 | 9/2014 |
| GB | 2492757 A | 1/2013 |

*Primary Examiner* — Jerry D Robbins
(74) *Attorney, Agent, or Firm* — Young Basile Hanlon & MacFarlane, P.C.

(57) ABSTRACT

A charging station for an electric vehicle includes a passive alignment mechanism that includes a longitudinal translation stage that allows motion in a longitudinal direction, a charging plug connected to the passive alignment mechanism, and a releasable connector. The releasable connector resists motion of the longitudinal translation stage in a connected position when a magnitude of an external force applied in the longitudinal direction is below a threshold. The releasable connector moves from the connected position to a released position to allow motion of the longitudinal translation stage when the magnitude of the external force applied in the longitudinal direction is above the threshold.

22 Claims, 10 Drawing Sheets

(56) References Cited

U.S. PATENT DOCUMENTS

| | | | |
|---|---|---|---|
| 2011/0300738 A1* | 12/2011 | Hengel | H01R 13/44 |
| | | | 439/374 |
| 2012/0029750 A1 | 2/2012 | Ortmann et al. | |
| 2012/0181765 A1 | 7/2012 | Hill et al. | |
| 2013/0076902 A1 | 3/2013 | Gao et al. | |
| 2014/0095022 A1 | 4/2014 | Cashman et al. | |
| 2014/0312580 A1 | 10/2014 | Gale | |
| 2015/0197130 A1 | 7/2015 | Smith et al. | |
| 2017/0120712 A1 | 5/2017 | Coombs et al. | |
| 2017/0166070 A1 | 6/2017 | Dunger et al. | |

* cited by examiner

CHARGING STATION WITH PASSIVE ALIGNMENT MECHANISM

CROSS-REFERENCE TO RELATED APPLICATIONS

This application claims the benefit of U.S. Provisional Application No. 62/555,132, filed on Sep. 7, 2017, the content of which is hereby incorporated by reference in its entirety for all purposes.

TECHNICAL FIELD

The application relates generally to charging electric vehicles.

BACKGROUND

Some electric vehicles include battery packs that are recharged using a charging station when the vehicle is not being driven. The charging station may receive electrical power from a power grid. One common design for connecting an electrical vehicle to a charging station utilizes a charging port of the vehicle and a charging cable of the charging station. The charging cable is manually connected to the charging port, typically by the operator of the vehicle, upon exiting the vehicle.

SUMMARY

One aspect of the disclosure is a charging station for an electric vehicle. The charging station includes a passive alignment mechanism that includes a longitudinal translation stage that allows motion in a longitudinal direction, a charging plug connected to the passive alignment mechanism, and a releasable connector. The releasable connector resists motion of the longitudinal translation stage in a connected position when a magnitude of an external force applied in the longitudinal direction is below a threshold. The releasable connector moves from the connected position to a released position to allow motion of the longitudinal translation stage when the magnitude of the external force applied in the longitudinal direction is above the threshold.

In some implementations, the charging station includes a longitudinal biasing element that urges the releasable connector toward the connected position.

In some implementations, the passive alignment mechanism includes a lateral translation stage that allows motion in a lateral direction. The passive alignment mechanism may also include a lateral centering element that urges the lateral translation stage toward a centered position.

In some implementations, the passive alignment mechanism includes an elevational translation stage that allows motion in an elevational direction. The elevational translation stage may also include an elevational biasing element that urges the elevational translation stage in at least one of an upward direction or a downward direction. In some implementations, the charging plug is connected to the passive alignment mechanism by a rotationally compliant connector that allows motion of the charging plug in at least one degree of rotational freedom. The rotationally compliant connector may include a ball joint.

In some implementations, the releasable connector includes a magnet.

Another aspect of the disclosure is a charging assembly for an electric vehicle. The charging assembly includes a charging station, and a receptacle assembly. The charging station has a passive alignment mechanism that allows motion in at least one translational degree of freedom, a charging plug that is connected to the passive alignment mechanism, and a guide element that is connected to the passive alignment mechanism. The receptacle assembly includes a charging receptacle that is connectable to the charging plug of the charging station and a guide surface. The guide element of the charging station is engageable with the guide surface to cause movement of the passive alignment mechanism in response to motion of the electric vehicle toward the charging station.

In some implementations, the receptacle assembly includes a cover that is movable between a closed position and an open position. The guide surface is connected to the cover. The guide surface may be positioned on an interior surface of the cover.

In some implementations, the passive alignment mechanism includes a longitudinal translation stage, a lateral translation stage, and an elevational translation stage.

In some implementations, the charging station includes a releasable connector that restrains movement of the longitudinal translation stage during insertion of the charging plug into the charging receptacle, and allows movement of the longitudinal translation stage upon full insertion of the charging plug into the charging receptacle.

Another aspect of the disclosure is a charging station for an electric vehicle. The charging station includes a passive alignment mechanism and a charging plug. The passive alignment mechanism includes a longitudinal translation stage that allows motion in a longitudinal direction, a lateral translation stage that allows motion in a lateral direction, and an elevational translation stage that allows motion in an elevational direction. The charging plug is connected to the passive alignment mechanism by a ball joint to allow rotation of the charging plug relative to the passive alignment mechanism in a pitch direction, a roll direction, and a yaw direction.

In some implementations, the ball joint is connected to the longitudinal translation stage of the passive alignment mechanism.

In some implementations, the charging station includes a guide element that is connected to the passive alignment mechanism to cause motion of the lateral translation stage and the elevational translation stage in response to an external force. The charging plug may be wider than the guide element. The guide element may be located above the charging plug. The elevational translation stage may be biased in an upward direction.

DETAILED DESCRIPTION

Exiting a vehicle to connect the vehicle to a charging station may be inconvenient for the operator of the vehicle. In addition, charging stations that require manual connection of the vehicle to the charging station do not permit charging to be performed when no human operator is present. The systems and methods described herein allow an electric vehicle to connect to a charging station without manual connection by an operator. As an example, a charging station may include a charging plug that is mounted using one or more passive translation stages that change position upon contact with a structure that is formed on the vehicle. The vehicle-side structures, including a charging receptacle, are aligned with the charging plug by driving the vehicle, either under manual control or under autonomous control.

Figure 1A:
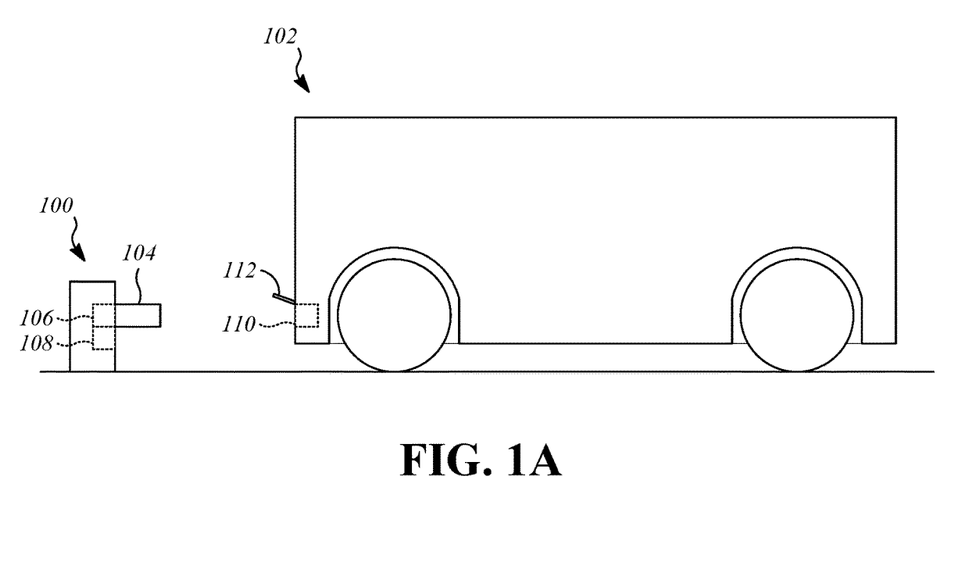
FIG. 1A is an illustration showing a charging station and a vehicle in a disconnected position.
Figure 1B:
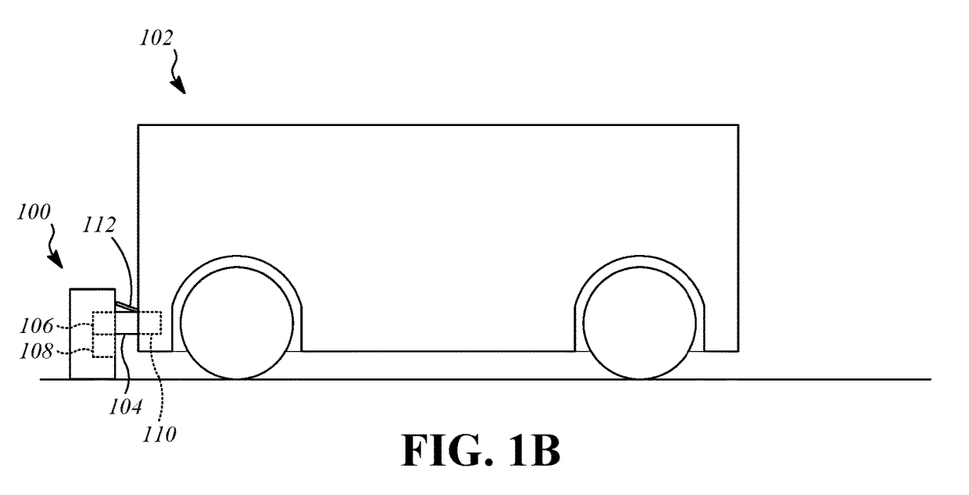
FIG. 1B is an illustration showing the charging station and the vehicle in a connected position.

FIG. 1A is an illustration showing a charging station 100 and a vehicle 102 in a disconnected position. FIG. 1B is an illustration showing the charging station 100 and the vehicle 102 in a connected position. The charging station 100 can be a permanently installed structure at a fixed location, such as a parking lot or a garage. The charging station 100 includes a charging plug 104, a passive alignment mechanism 106, and, optionally, an active elevation adjustment mechanism 108. The vehicle 102 is an electric vehicle that includes a rechargeable battery pack and an electric powertrain (e.g., electric motors). The vehicle 102 includes a charging receptacle 110 and a cover 112.

The charging plug 104 supplies electrical power to the vehicle 102 by electrical connection to the charging receptacle 110. To allow transfer of electrical power, the charging plug 104 and the charging receptacle 110 include complementary sets of conductive or inductive components. The electrical power may be received by the charging station 100 from, for example, a power grid. The charging plug 104 is supported by the passive alignment mechanism 106. The passive alignment mechanism 106 allows fine adjustment of the position of the charging plug 104 in response to application of external force to the charging plug and/or the passive alignment mechanism 106, as will be described herein. The active elevation adjustment mechanism 108 is optional, and may be provided to allow gross adjustment of the elevation of the charging plug 104 relative to the vehicle 102 prior to passive adjustment. As an example, the active elevation adjustment mechanism 108 can include an electric motor or linear actuator, a translation stage such slides, tracks or lead screws, and sensors to control the gross elevational adjustment. The active elevation adjustment mechanism 108 may be omitted in favor of installing the charging plug 104 at an elevation that matches the elevation of the charging receptacle 110, or in favor of using a vehicle-side system for gross elevational adjustment. For example, an active suspension system of the vehicle 102 may be used for gross elevational adjustment by raising or lowering the body of the vehicle 102 to place the charging receptacle 110 in general elevational alignment with the charging plug 104.

The cover 112 of the charging receptacle 110 is moveable between a closed position and an open position relative to the charging receptacle 110 to allow connection of the charging components of the charging plug 104 to the charging components of the charging receptacle 110. In the closed position, access to an interior of the charging receptacle 110 is blocked such that the charging plug 104 cannot be connected to the charging receptacle 110. In the open position, access to an interior of the charging receptacle 110 is not blocked such that the charging plug 104 can be connected to the charging receptacle 110.

Figure 2:
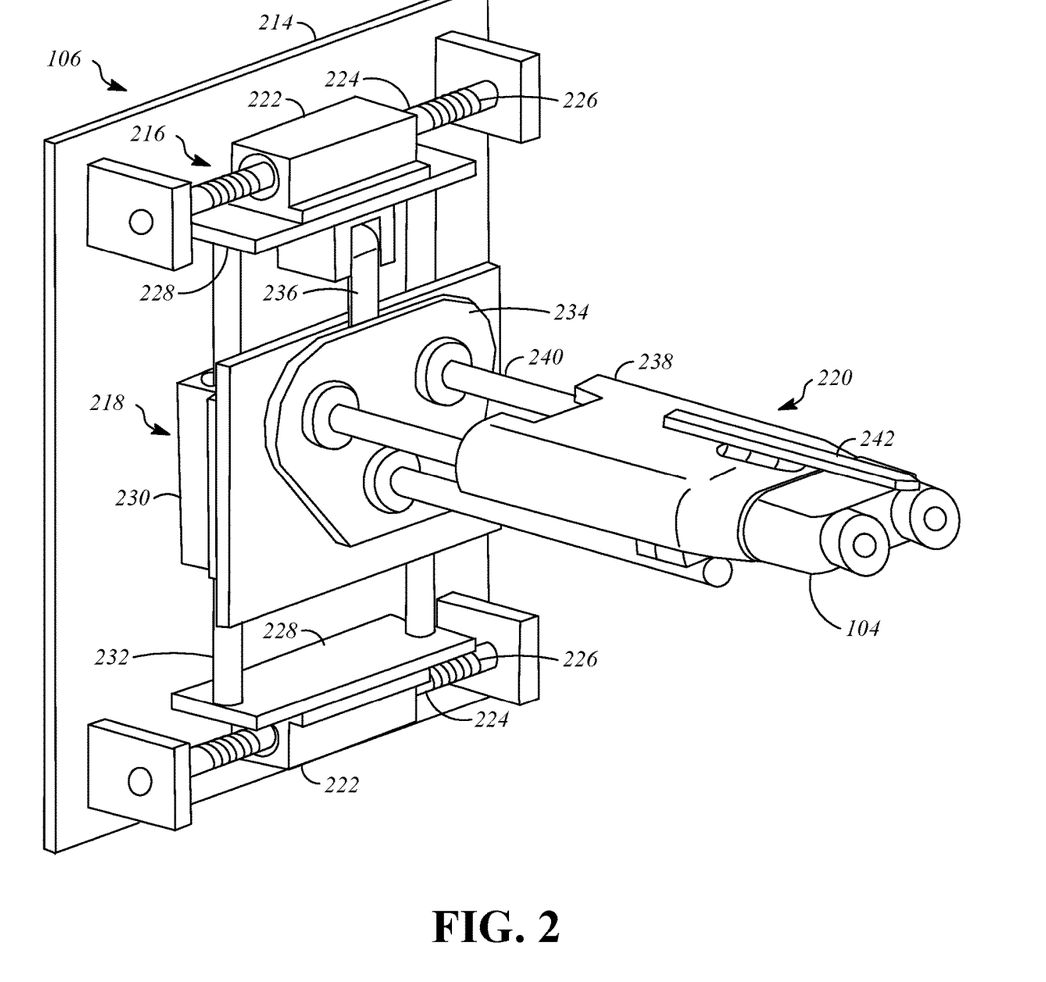
FIG. 2 is a perspective view showing a passive alignment mechanism and a charging plug of the charging station.

FIG. 2 is a perspective view showing the passive alignment mechanism 106 and the charging plug 104 of the charging station 100. The passive alignment mechanism 106 includes a base 214, a lateral translation stage 216, an elevational translation stage 218, and a longitudinal translation stage 220.

In the illustrated example, components of the passive alignment mechanism 106 are mounted to and supported by the base 214. The base 214 may be a structural component of the charging station 100. The components of the passive alignment mechanism 106 may be otherwise supported and mounted.

The lateral translation stage 216 allows fine adjustment in a lateral (i.e., side-to-side) direction in response to external forces. The lateral translation stage 216 is passive, in that it does not include motors or other controllable motion causing components. In the illustrated example, the lateral translation stage 216 includes slides 222 that are mounted on rods 224 such that the slides 222 can translate laterally along the rods 224. The lateral translation stage 216 may also include a lateral centering element, such as centering springs 226. The centering springs 226 urge the lateral translation stage 216 toward a centered position. For example, the centering springs 226 may be located on the rods 224 on both sides of each of the slides 222 to apply laterally opposed spring forces to the slides 222, with a centered position being a resting position that the slides 222 return to absent application of an external force. The slides 222 support structures such as plates 228 that allow connection to the elevational translation stage 218.

The elevational translation stage 218 allows fine adjustment in an elevational (i.e., upward-and-downward) direction in response to external forces. The elevational translation stage 218 is passive, in that it does not include motors or other controllable motion causing components. In the illustrated example, the elevational translation stage 218 includes slides 230 that are mounted on rods 232 such that the slides 230 can translate elevationally along the rods 232.

A plate 234 is connected to the slides 230 to allow connection to the longitudinal translation stage 220.

The elevational translation stage 218 may also include an elevational biasing element that urges the elevational translation stage 218 in at least one of an upward direction or a downward direction. In the illustrated example the elevational biasing element is a constant force spring 236 that biases the elevational translation stage 218 upward by urging upward movement of the slides 230 relative to the rods 232. Thus, the elevational translation stage 218 is able to move in the downward direction in response to application of an external force, and upward under influence of the constant force spring 236 (or other biasing element) when the external force is diminished or removed.

The longitudinal translation stage 220 allows fine adjustment in longitudinal (i.e., front-to-rear) direction in response to external forces. The longitudinal translation stage 220 is passive, in that it does not include motors or other controllable motion causing components. In the illustrated example, the longitudinal translation stage 220 includes a body 238 that is mounted on rods 240. The body 238 can translate longitudinally along the rods 240 toward and away from the plate 234 of the elevational translation stage 218. The body 238 may be biased toward a neutral position relative to the rods 240, as will be explained further herein.

A guide element 242 is connected to the passive alignment mechanism 106 to cause motion of the lateral translation stage 216, the elevational translation stage 218, and/or the longitudinal translation stage 220 in response to application of an external force. Forces applied to the guide element 242 by contact with vehicle-side structures cause motion of the passive alignment mechanism 106 during motion of the vehicle 102 relative to the charging station 100 to align the charging plug 104 with the charging receptacle 110.

The guide element 242 is a narrow, elongate structure that is made from a rigid material and is fixed to a portion of the charging plug 104. In the illustrated example, the guide element 242 is connected to a top surface of the body 238 and extends forward from the body 238 such that a portion of the guide element 242 is located above the charging plug 104. A portion of the guide element 242 may extend forward relative to the charging plug 104. The charging plug 104 is wider than the guide element 242, which reduces the required size of vehicle-side guide structures, as will be described.

Figure 3A:
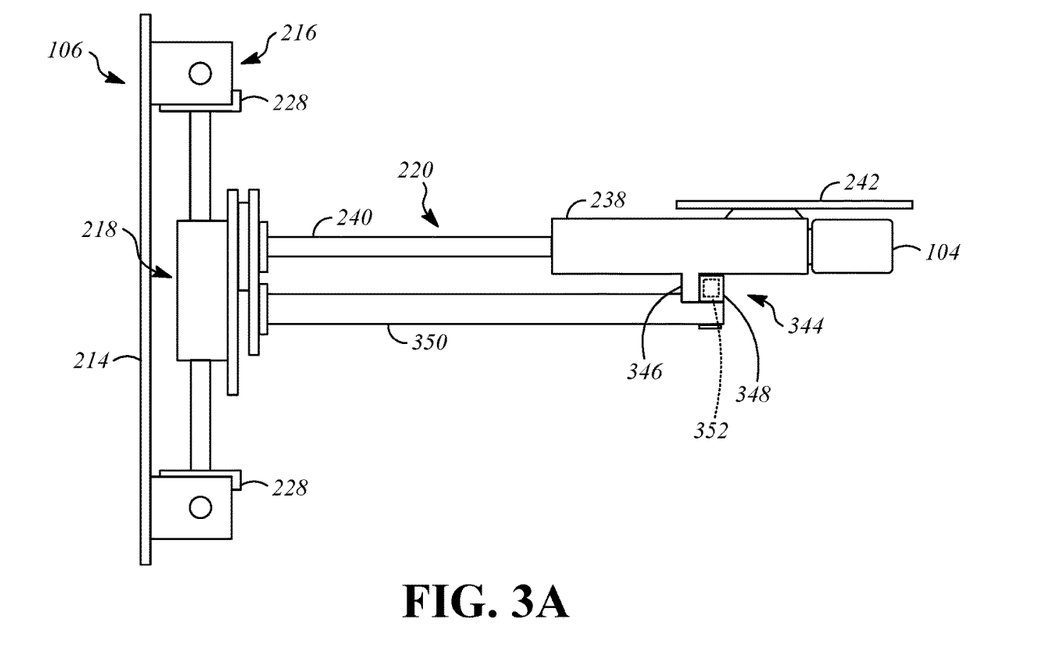
FIG. 3A is a side view showing the passive alignment mechanism and the charging plug of the charging station with a releasable connector in a connected position.
Figure 3B:
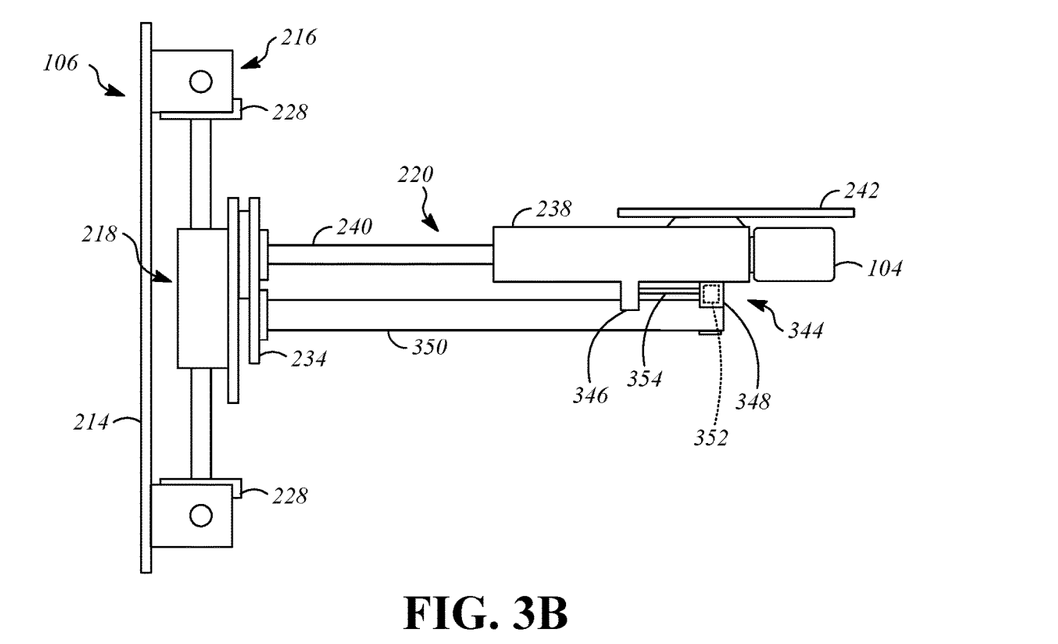
FIG. 3B is a side view showing the passive alignment mechanism and the charging plug of the charging station with the releasable connector in a released position.

FIG. 3A is a side view showing the passive alignment mechanism 106 and the charging plug 104 of the charging station 100 with a releasable connector 344 in a connected position. FIG. 3B is a side view showing the passive alignment mechanism 106 and the charging plug 104 of the charging station 100 with the releasable connector 344 in a released position. The releasable connector 344 moves between the connected position and the released position in response to external forces applied to the charging plug 104 and/or the passive alignment mechanism 106. The releasable connector 344 functions to ensure secure connection of the charging plug 104 by restraining compliant motion while the charging plug 104 is in the process of connecting to the charging receptacle 110, and releasing to allow compliant movement in the longitudinal direction after the charging plug 104 and the charging receptacle 110 are fully connected.

The releasable connector 344 includes a first connecting part 346 formed on the body 238 and a second connecting part 348. The second connecting part 348 is located on a support 350. The support 350 is connected to other portions of the passive alignment mechanism 106 such that it moves in correspondence with the rods 240 of the longitudinal translation stage 220 (e.g., in the lateral direction and the elevational direction). The support 350 is fixed longitudinally and does not move with the body 238, and the first connecting part 346 is therefore moveable longitudinally relative to the second connecting part 348.

The first connecting part 346 and the second connecting part 348 may incorporate any type of coupling or connecting mechanism that resists motion of the body 238 of the longitudinal translation stage 220 in the connected position when a magnitude the an external force applied in the longitudinal direction is below a threshold, and moves from the connected position to a released position to allow motion of the body 238 of the longitudinal translation stage 220 when the magnitude of the external force applied in the longitudinal direction is above the threshold. The threshold is a function of the configuration of the first connecting part 346 and the second connecting part 348, and is configured to restrain movement of the longitudinal translation stage 220 during insertion of the charging plug 104 into the charging receptacle 110, and allow movement of the longitudinal translation stage 220 upon full insertion of the charging plug 104 into the charging receptacle 110. In this manner, the electrical contacts are not exposed until alignment is completed. In the illustrated example, the first connecting part 346 and the second connecting part 348 are magnetically attracted, such as by incorporation of a magnet 352 in the second connecting part 348 and incorporation of a ferromagnetic material in the first connecting part 346 and separate when the threshold is reached (i.e., when the magnetic attraction force is exceeded by the external force). Alternative implementations are possible, such as a friction-based connection between the first connecting part 346 and the second connecting part 348.

A longitudinal biasing element can be included in the longitudinal translation stage 220 to urge the releasable connector 344 toward the connected position. In the illustrated example, the first connecting part 346 and the second connecting part 348 are connected by a constant rate spring 354. Other biasing structures can be used.

Figure 4A:
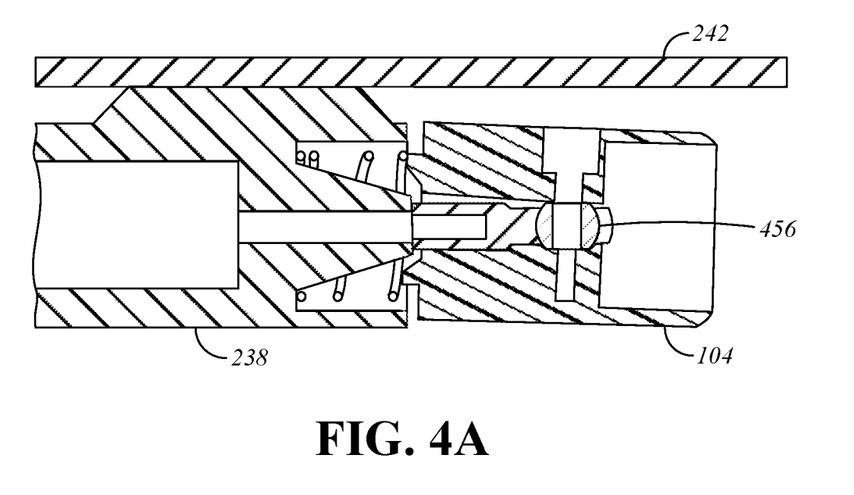
FIG. 4A is a side cross-section view showing connection of the passive alignment mechanism to the charging plug by a rotationally compliant connector.
Figure 4B:
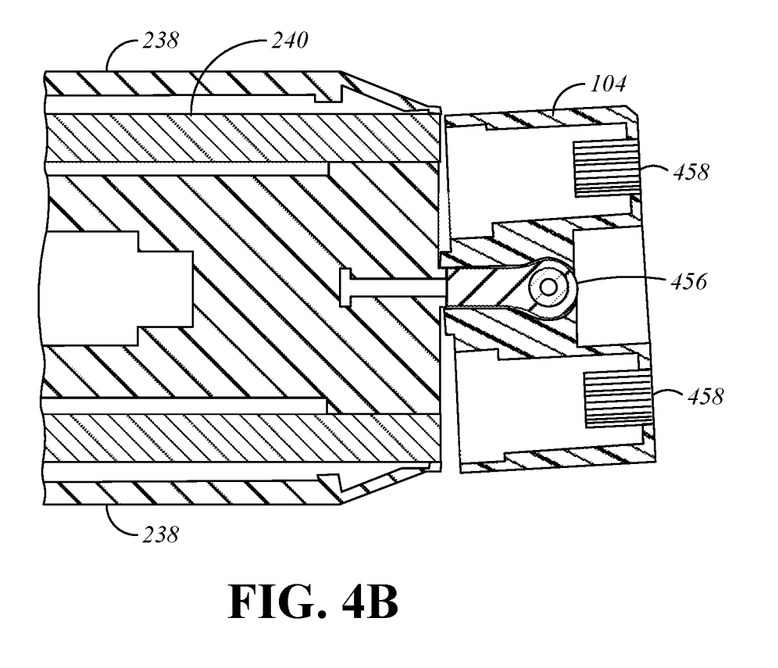
FIG. 4B is a top cross-section view showing connection of the passive alignment mechanism to the charging plug by the rotationally compliant connector.

FIG. 4A is a side cross-section view showing connection of the passive alignment mechanism 106 to the charging plug 104 by a rotationally compliant connector 456. FIG. 4B is a top cross-section view showing connection of the passive alignment mechanism 106 to the charging plug 104 by the rotationally compliant connector 456. The rotationally compliant connector 456 allows rotational adjustment in one or more rotational degrees of freedom. In the illustrated example, the rotationally compliant connector 456 is a ball joint that is connected to the body 238 and is seated in a complementary recess in the charging plug 104. Use of a ball joint for the rotationally compliant connector 456 can allow adjustment in up to all three rotational degrees of freedom (i.e., pitch, yaw, and roll). In the illustrated example, the rotationally compliant connector 456 is positioned near a lateral center point of the charging plug between a pair of conductive connector portions 458 of the charging plug 104.

Figure 5A:
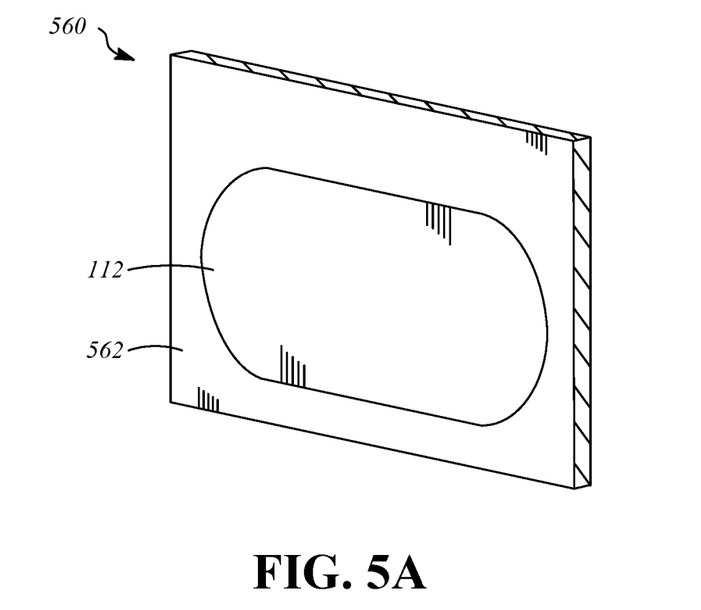
FIG. 5A is a perspective view showing a receptacle assembly with a cover in a closed position.
Figure 5B:
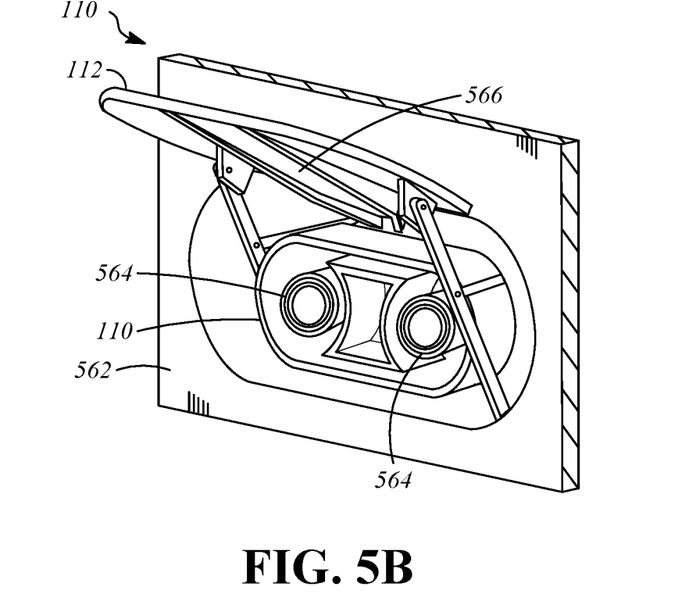
FIG. 5B is a perspective view showing a receptacle assembly with the cover in an open position.

FIG. 5A is a perspective view showing a receptacle assembly 560 that includes the charging receptacle 110 and the cover 112 with the cover 112 in a closed position. FIG. 5B is a perspective view showing the receptacle assembly 560 with the cover 112 in an open position. When the cover 112 is in the closed position, it may be flush with respect to an adjacent structure, such as a surface 562, which may be an exterior body surface of the vehicle 102. When the cover 112 is in the open position, the charging receptacle 110 is accessible, including conductive connector portions 564 of the charging receptacle 110.

The receptacle assembly 560 includes a guide surface 566. In the illustrated example, the guide surface 566 is connected to the cover 112, and is positioned on an interior surface of the cover 112 such that it is concealed when the cover 112 is closed and is accessible when the cover 112 is open.

Figure 6A:
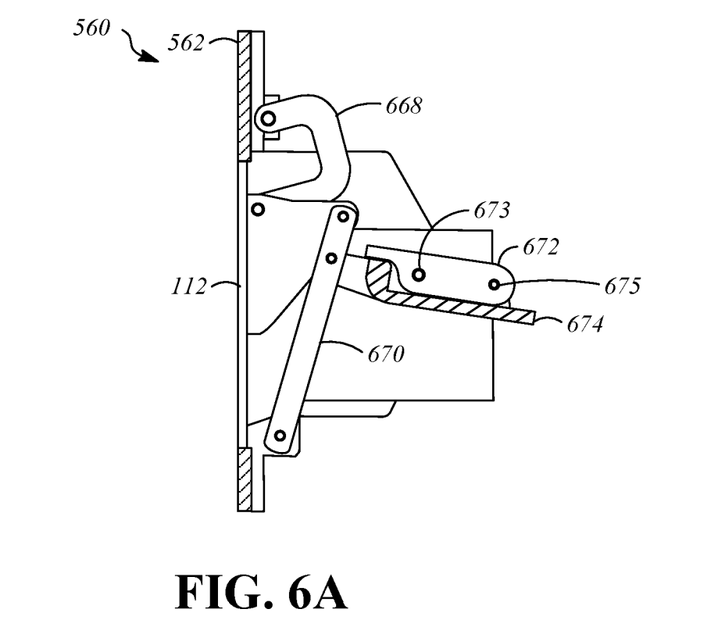
FIG. 6A is a side cross-section view showing the receptacle assembly with the cover in the closed position.
Figure 6B:
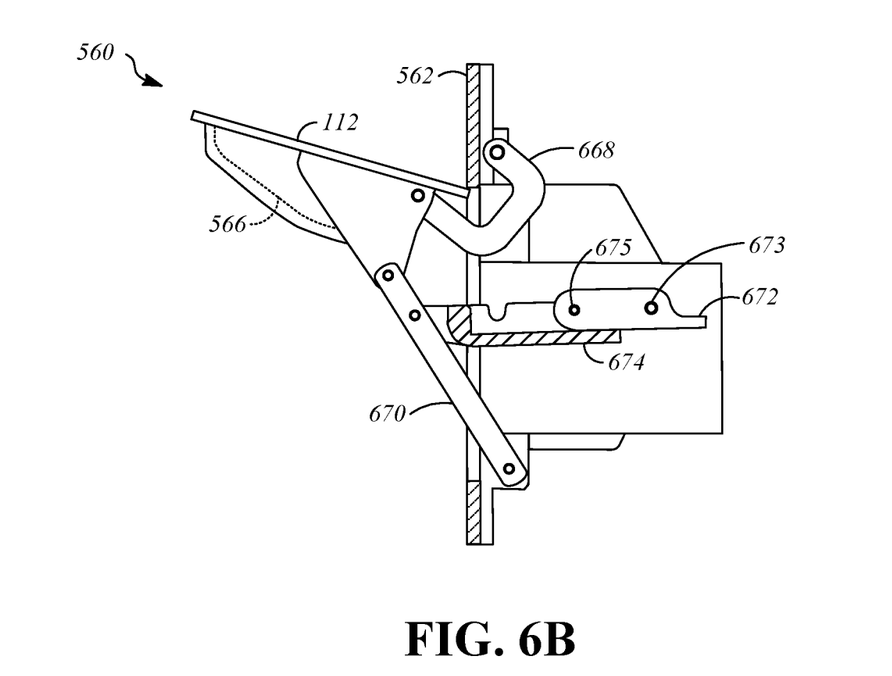
FIG. 6B is a side cross-section view showing the receptacle assembly with the cover in the open position.

FIG. 6A is a side cross-section view showing the receptacle assembly 560 with the cover 112 in the closed position. FIG. 6B is a side cross-section view showing the receptacle assembly 560 with the cover 112 in the open position. The cover 112 is supported by a four-bar linkage including upper bars 668 and lower bars 670 that regulate motion of the cover 112 relative to the surface 562 and the charging receptacle 110. The cover 112 is moved between the closed and open positions by a driving arm 672 and a driven arm 674 that are placed in an over-center condition in the open position to lock the cover 112 in the open position. The driving arm 672 is connected to a rotary actuator (e.g., an electric motor) at a drive joint 673 and is connected to the driven arm 674 at a connecting joint 675. Magnetic elements can be incorporated in the driving arm 672 and/or the driven arm 674 to resist relative motion of the driving arm 672 and the driven arm 674 when the cover 112 is in the open position or the closed position, to resist inadvertent motion of the cover 112, for example, as a result of vibrations.

Figure 7A:
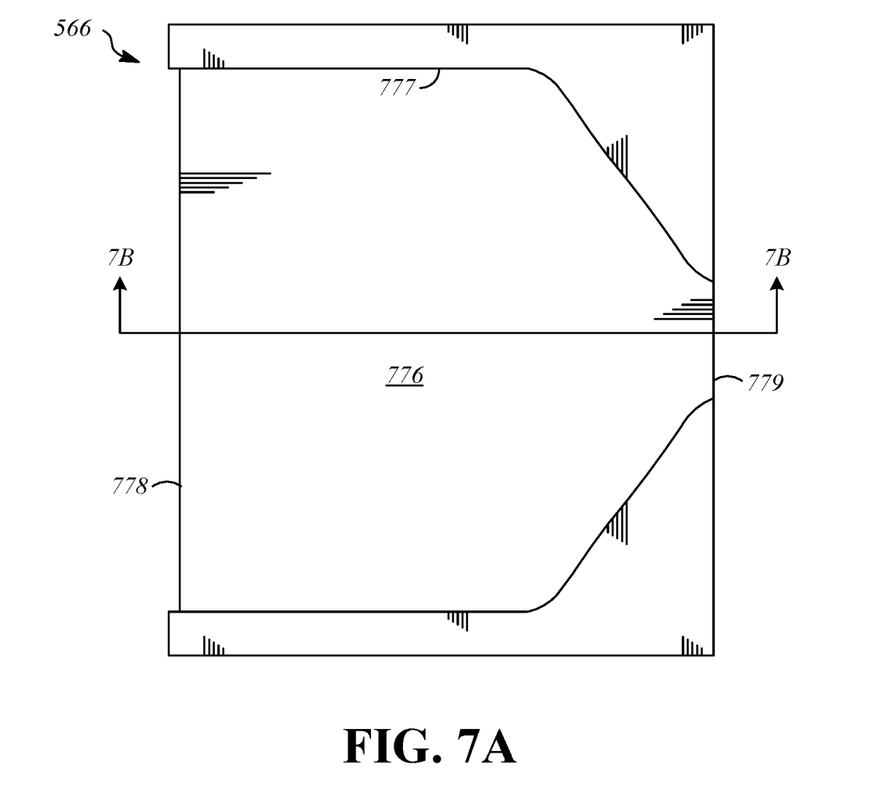
FIG. 7A is a bottom view showing a guide surface.
Figure 7B:
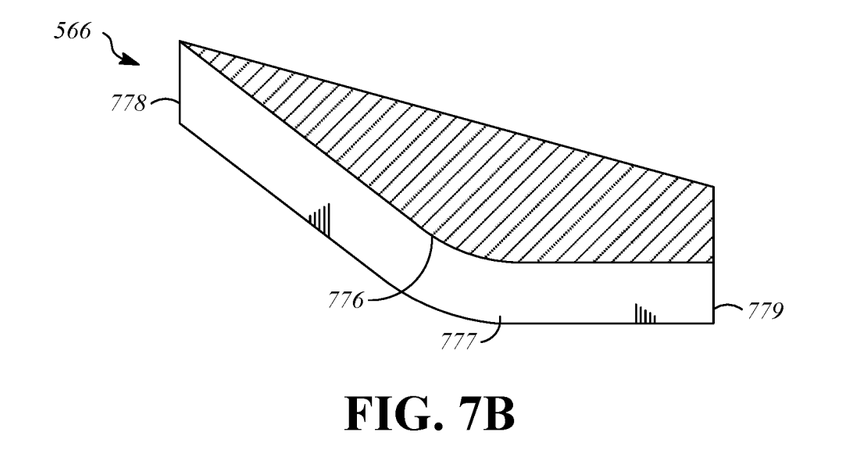
FIG. 7B is a side cross-section taken on line 7B-7B of FIG. 7A showing the guide surface.

FIG. 7A is a bottom view showing the guide surface 566, and FIG. 7B is a side cross-section taken on line 7B-7B of FIG. 7A showing the guide surface 566. The guide surface 566 has a central portion 776, lateral portions 777, a first end 778, and a second end 779.

The guide surface 566 is configured to be engaged by the guide element 242 as the vehicle 102 approaches the charging station 100 to cause motion of the passive alignment mechanism 106 to bring the charging plug 104 into alignment with the charging receptacle 110. The central portion 776 of the guide surface 566 has a vertical profile that is configured to engage the guide element 242 for vertically aligning the charging plug 104 as the guide element 242 moves along the central portion 776 of the guide surface 566 from the first end 778 toward the second end 779. The lateral portions 777 extend outward from the central portion 776 of the guide surface 566 and have lateral profiles that taper from the first end 778 to the second end 779 to restrict the available width for traversal by the guide element 242 and to laterally align the charging plug 104 as the guide element 242 moves along one of the lateral portions 777 of the guide surface 566 from the first end 778 toward the second end 779.

Figure 8A:
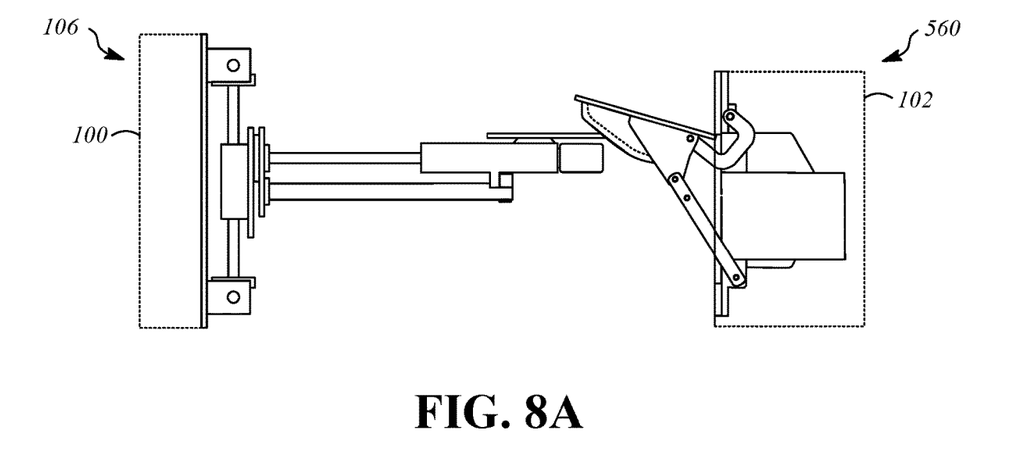
FIG. 8A is a side view showing a charging assembly in a disconnected position.
Figure 8B:
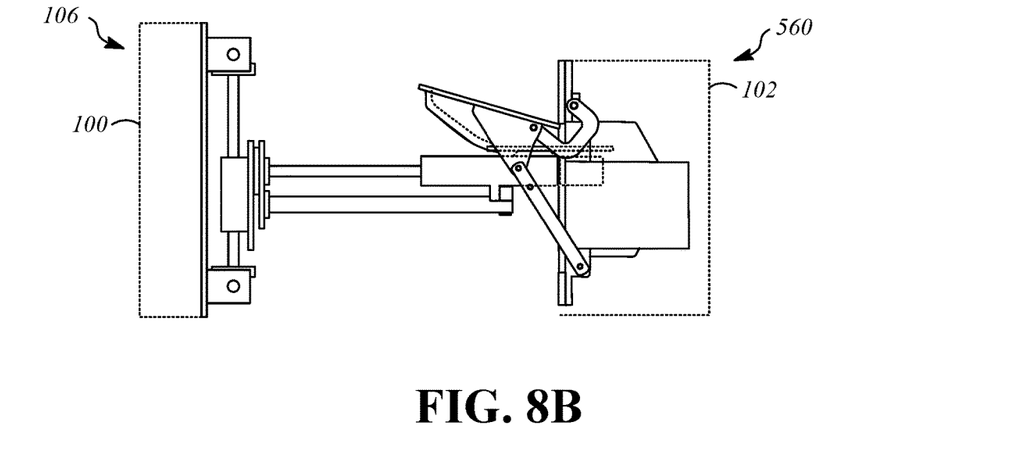
FIG. 8B is a side view showing the charging assembly during movement from the disconnected position to a connected position.
Figure 8C:
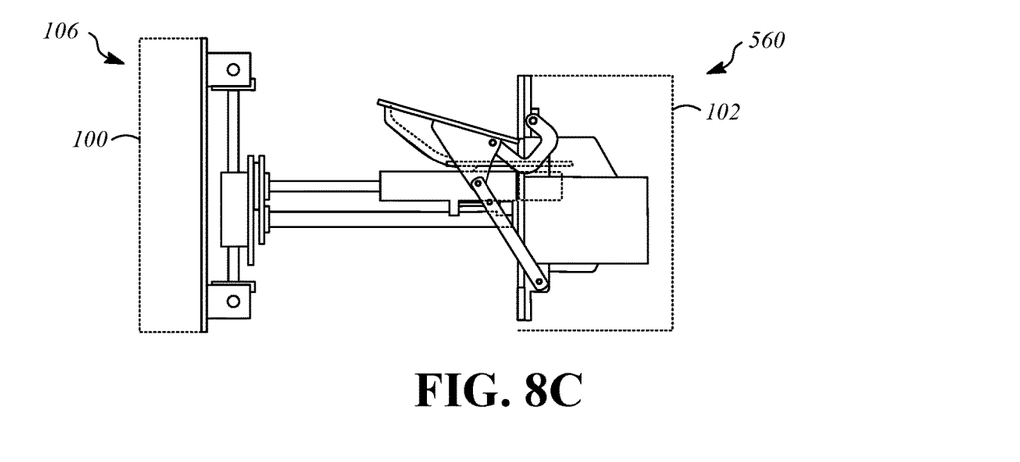
FIG. 8C is a side view showing the charging assembly in the connected position.

FIG. 8A is a side view showing a charging assembly that includes the charging plug 104 and the receptacle assembly 560 in a disconnected position. FIG. 8B is a side view showing the charging assembly during movement from the disconnected position to a connected position. FIG. 8C is a side view showing the charging assembly in the connected position. In FIG. 8A, the guide element 242 comes into contact with the guide surface 566. This engagement causes downward and lateral motion of the charging plug 104 using the passive alignment mechanism 106 as the charging plug 104 moves into contact with the charging receptacle 110 during movement to the connected position as shown in FIG. 8B. After connection of the charging plug 104 to the charging receptacle 110, the releasable connector 344 may move from the connected position to the released position to allow compliant longitudinal motion using the longitudinal translation stage 220 of the passive alignment mechanism 106 if the vehicle 102 continues moving toward the station 100.

Figure 9:
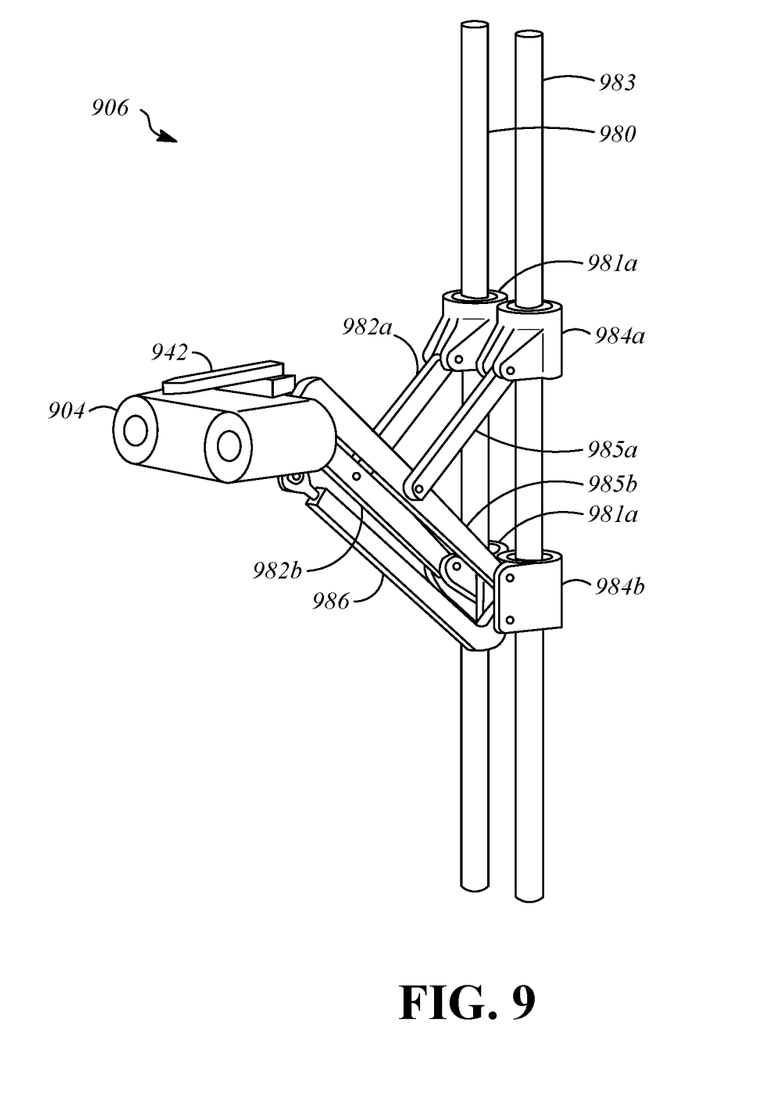
FIG. 9 is a perspective view showing a passive alignment mechanism and a charging plug according to an alternative implementation.

FIG. 9 is a perspective view showing a passive alignment mechanism 906 and a charging plug 904 for use as in a charging station, such as the charging station 100, according to an alternative implementation. The passive alignment mechanism 906 has a combined translation and rotation stage that includes a first rod 980, a first upper slide 981a, a first lower slide 981b, a first upper link 982a, a first lower link 982b, a second rod 983, a second upper slide 984a, a second lower slide 984b, a second upper link 985a, a second lower link 985b, and a stabilizing link 986. The passive alignment mechanism 906 moves in response to external forces, for example, using a guide element 942, which is similar to the guide element 242.

The first upper slide 981a and the first lower slide 981b are positioned on the first rod 980 and are independently slidable with respect to it. Biasing elements, such as springs, may be located on the first rod 980 to enforce a desired neutral position for the first upper slide 981a and the first lower slide 981b. The first upper link 982a is pivotally connected to the first upper slide 981a. The first lower link 982b is pivotally connected to the first lower slide 981b and is also pivotally connected to the first upper link 982a by a pivotal connection at an intermediate point along the first lower link 982b. The first lower link 982b is also connected to the charging plug 904, either directly or by an intermediate structure such as a bracket and/or a rotationally compliant joint. The first upper slide 981a and the first lower slide 981b may move upward and downward in unison along the first rod 980, which causes corresponding upward and downward motion of the first upper link 982a and the first lower link 982b. The first upper slide 981a and the first lower slide 981b may move toward each other, which causes longitudinal extension of the first upper link 982a and the first lower link 982b. The first upper slide 981a and the first lower slide 981b may move away from each other, which causes longitudinal retraction of the first upper slide 981a and the first lower slide 981b.

The second upper slide 984a and the second lower slide 984b are positioned on the second rod 983 and independently slidable with respect to it. Biasing elements, such as springs, may be located on the second rod 983 to enforce a desired neutral position for the second upper slide 984a and the second lower slide 984b. The second upper link 985a is pivotally connected to the second upper slide 984a. The second lower link 985b is pivotally connected to the second lower slide 984b and is also pivotally connected to the second upper link 985a by a pivotal connection at an intermediate point along the second lower link 985b. The second lower link 985b is also connected to the charging plug 904, either directly or by an intermediate structure such as a bracket and/or a rotationally compliant joint. The second upper slide 984a and the second lower slide 984b may move upward and downward in unison along the second rod 983, which causes corresponding upward and downward motion of the second upper link 985a and the second lower link 985b. The second upper slide 984a and the second lower slide 984b may move toward each other, which causes longitudinal extension of the second upper link 985a and the second lower link 985b. The second upper slide 984a and the second lower slide 984b may move away from each other, which causes longitudinal retraction of the second upper slide 984a and the second lower slide 984b.

Differential motion of first upper slide 981a and the first lower slide 981b relative to the second upper slide 984a and the second lower slide 984*b* is operable to cause lateral adjustment of the charging plug 904. The stabilizing link 986 is interconnected with the first lower link 982*b* and the second lower link 985*b* at the charging plug 904 to enforce leveling during translational adjustment. The charging plug 904 can be connected to the first lower link 982*b* and the second lower link 985*b* in a rotationally compliant manner, for example, using a connector analogous to the rotationally compliant connector 456.

Figure 10:
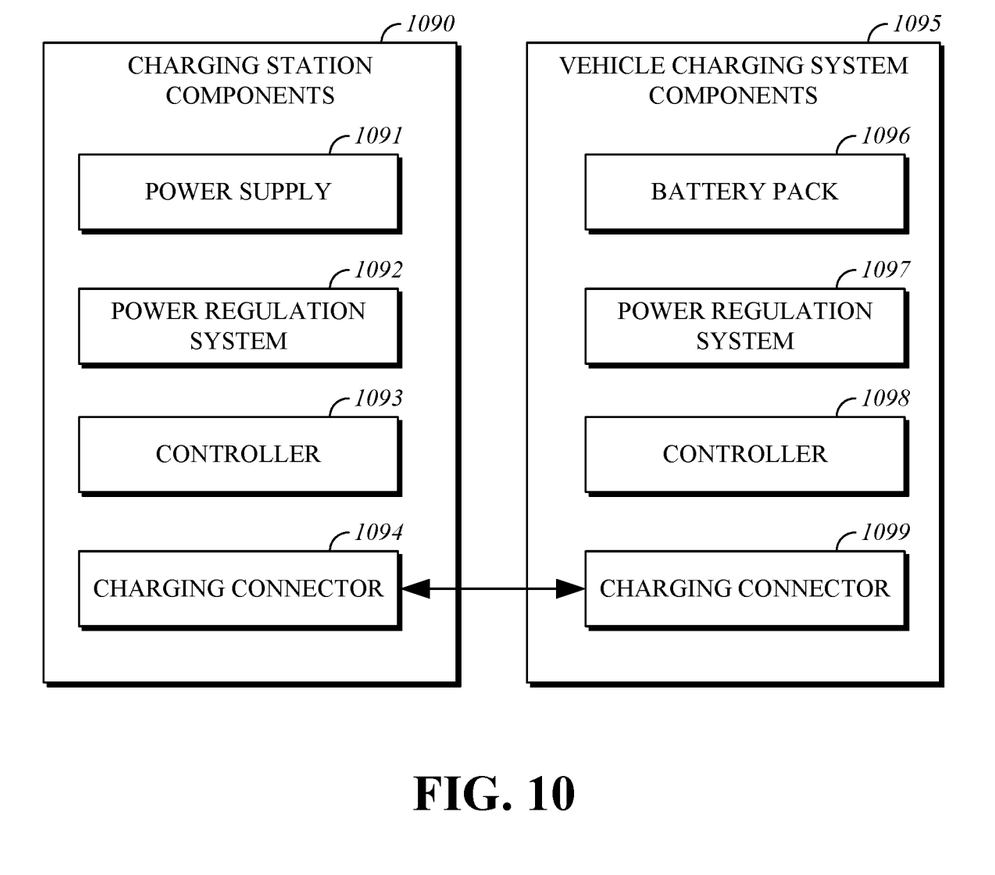
FIG. 10 is a block diagram that shows charging station components and vehicle charging system components.

FIG. 10 is a block diagram that shows charging station components 1090 and vehicle charging system components 1095. The charging station components 1090 can be incorporated in, for example, the charging station 100 to supply electrical power. The vehicle charging system components 1095 can be incorporated in, for example, the vehicle 102 to receive electrical power. The charging station components 1090 can include a power supply 1091 that is connected to a source of electrical power such as a power grid, a power regulation system 1092 that conditions the power in an appropriate manner for supply to the vehicle charging system components 1095, a controller 1093 such as a computing device or integrated circuit that regulates operation of the power regulation system 1092 and may communicate with the vehicle charging system components 1095, and a charging connector 1094, which may include conductive components or inductive components for connection to the vehicle charging system components 1095. The vehicle charging system components 1095 can be incorporated in the vehicle 102 and can include a battery pack 1096, a power regulation system 1097 to control supply of power to the battery pack 1096 and supply of power from the battery pack 1096, a controller 1098 such as a computing device or integrated circuit that regulates operation of the power regulation system 1097 and may communicate with the charging station components 1090, and a charging connector 1099, which may include conductive components or inductive components for connection to the charging station components 1090.

As used in the claims, phrases in the form of "at least one of A, B, or C" should be interpreted to encompass only A, or only B, or only C, or any combination of A, B and C.

What is claimed is:

1. A charging station for an electric vehicle, comprising:
    a charging plug;
    a passive alignment mechanism that includes a support and a longitudinal translation stage, wherein the charging plug is connected to the passive alignment mechanism so that the longitudinal translation stage allows motion of the charging plug in a longitudinal direction with respect to the support; and
    a releasable connector that is connected to the charging plug and is connected to the support of the passive alignment mechanism, wherein the releasable connector is movable between a connected position, in which the releasable connector resists longitudinal motion of the charging plug with respect to the support, and a released position, in which the releasable connector does not resist longitudinal motion of the charging plug with respect to the support.

2. The charging station of claim 1, further comprising:
    a longitudinal biasing element that urges the releasable connector toward the connected position.

3. The charging station of claim 1, wherein the passive alignment mechanism includes a lateral translation stage that allows motion of the charging plug in a lateral direction.

4. The charging station of claim 3, further comprising:
    a lateral centering element that urges the lateral translation stage toward a centered position.

5. The charging station of claim 3, wherein the passive alignment mechanism includes an elevational translation stage that allows motion of the charging plug in an elevational direction.

6. The charging station of claim 5, further comprising:
    an elevational biasing element that urges the elevational translation stage in at least one of an upward direction or a downward direction.

7. The charging station of claim 1, wherein the charging plug is connected to the passive alignment mechanism by a rotationally compliant connector that allows motion of the charging plug in at least one degree of rotational freedom.

8. The charging station of claim 7, wherein the rotationally compliant connector includes a ball joint.

9. The charging station of claim 1, wherein the releasable connector includes a magnet.

10. The charging station of claim 1, wherein the releasable connector is configured to move from the connected position to the released position when a magnitude of an external force applied in the longitudinal direction is above a threshold value.

11. A charging assembly for an electric vehicle, comprising:
    a charging station having a passive alignment mechanism that allows motion in at least one translational degree of freedom, a charging plug that is connected to the passive alignment mechanism for movement with the passive alignment mechanism in the at least one translational degree of freedom, and a guide element that is connected to the passive alignment mechanism for movement with the passive alignment mechanism in the at least one translational degree of freedom; and
    a receptacle assembly having a charging receptacle that is connectable to the charging plug of the charging station, and a guide surface, wherein the guide element of the charging station is engageable with the guide surface to cause movement of the passive alignment mechanism in response to motion of the electric vehicle toward the charging station.

12. The charging assembly of claim 11, wherein the receptacle assembly includes a cover that is movable between a closed position and an open position, wherein the guide surface is connected to the cover.

13. The charging assembly of claim 12, wherein the guide surface is positioned on an interior surface of the cover.

14. The charging assembly of claim 13, wherein:
    the guide surface has a vertical profile that is configured to engage the guide element to vertically align the charging plug as the guide element moves from a first end of the guide surface to a second end of the guide surface, and
    the guide surface has a lateral profile that is configured to engage the guide element and is tapered at the second end of the guide surface relative to the first end of the guide surface to laterally align the charging plug as the guide element moves from the first end of the guide surface to the second end of the guide surface.

15. The charging assembly of claim 11, wherein the passive alignment mechanism includes a longitudinal translation stage, a lateral translation stage, and an elevational translation stage.

16. The charging assembly of claim 15, wherein the charging station includes a releasable connector that restrains movement of the longitudinal translation stage during insertion of the charging plug into the charging receptacle, and allows movement of the longitudinal translation stage upon full insertion of the charging plug into the charging receptacle.

17. A charging station for an electric vehicle, comprising:
   a passive alignment mechanism that includes a longitudinal translation stage that allows motion in a longitudinal direction, a lateral translation stage that allows motion in a lateral direction, and an elevational translation stage that allows motion in an elevational direction;
   a guide element that is connected to the passive alignment mechanism to cause motion of the lateral translation stage and the elevational translation stage in response to an external force; and
   a charging plug that is connected to the passive alignment mechanism by a ball joint to allow rotation of the charging plug relative to the passive alignment mechanism and the guide element in a pitch direction, a roll direction, and a yaw direction.

18. The charging station of claim 17, wherein the ball joint is connected to the longitudinal translation stage of the passive alignment mechanism.

19. The charging station of claim 17, wherein a portion of the guide element extends forward relative to the charging plug.

20. A charging station for an electric vehicle, comprising:
   a passive alignment mechanism that includes a longitudinal translation stage that allows motion in a longitudinal direction, a lateral translation stage that allows motion in a lateral direction, and an elevational translation stage that allows motion in an elevational direction;
   a guide element that is connected to the passive alignment mechanism to cause motion of the lateral translation stage and the elevational translation stage in response to an external force; and
   a charging plug that is connected to the passive alignment mechanism, wherein the charging plug is wider than the guide element.

21. The charging station of claim 20, wherein the guide element is located above the charging plug.

22. The charging station of claim 21, wherein the elevational translation stage is biased in an upward direction.

* * * * *